United States Patent
Phillips et al.

(10) Patent No.: US 10,134,072 B2
(45) Date of Patent: Nov. 20, 2018

(54) MANAGEMENT OF AN ELECTRONIC CONTENT CATALOG BASED ON BANDWIDTH OR CONNECTED DISPLAY CAPABILITIES

(71) Applicant: ERICSSON TELEVISION INC., Duluth, GA (US)

(72) Inventors: Chris Phillips, Hartwell, GA (US); Charles Hammett Dasher, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 992 days.

(21) Appl. No.: 14/316,311

(22) Filed: Jun. 26, 2014

(65) Prior Publication Data

US 2015/0379605 A1 Dec. 31, 2015

(51) Int. Cl.
*G06Q 20/12* (2012.01)
*G06Q 30/06* (2012.01)
*H04N 21/45* (2011.01)
*H04N 21/258* (2011.01)
*H04N 21/462* (2011.01)
*H04N 21/2662* (2011.01)

(52) U.S. Cl.
CPC ....... *G06Q 30/0623* (2013.01); *G06Q 20/123* (2013.01); *H04N 21/25825* (2013.01); *H04N 21/2662* (2013.01); *H04N 21/4516* (2013.01); *H04N 21/462* (2013.01)

(58) Field of Classification Search
None
See application file for complete search history.

(56) References Cited

U.S. PATENT DOCUMENTS

2008/0201748 A1* 8/2008 Hasek ............... H04N 7/17309
725/98
2008/0238755 A1* 10/2008 Cruz ..................... G08C 17/00
341/176

(Continued)

OTHER PUBLICATIONS

Lin et al., "Video-on-Demand with Differentiated QoS based-on Available Bandwidth in IPTV," 2010 Fourth International Conference on Genetic and Evolutionary Computing, Shenzhen, 2010, pp. 731-734.URL: http://ieeexplore.ieee.org/stamp/stamp.jsp?tp= &arnumber=5715535&isnumber=571 (Year: 2010).*

*Primary Examiner* — Kathleen Palavecino
*Assistant Examiner* — Lance Y Cai (57) ABSTRACT

A system, method, and content provider server for creating a catalog of electronic content, wherein a customer accesses the catalog to browse and purchase electronic content, which is downloaded over a network to a customer premises where the electronic content is presented on a rendering device. Different pieces of the electronic content have different bandwidth requirements and impose different requirements for the rendering device. The server determines whether customer premises capabilities, including those of the rendering device, meet the requirements of each piece of electronic content, and populates the catalog only with pieces of electronic content for which the customer premises capabilities meet the requirements of the electronic content. Alternatively, the server may include all of the electronic content in the catalog while marking those pieces for which the customer premises capabilities do not meet the requirements of the electronic content.

7 Claims, 9 Drawing Sheets

(56) References Cited

U.S. PATENT DOCUMENTS

| | | | |
|---|---|---|---|
| 2010/0299552 A1* | 11/2010 | Schlack | H04L 47/10 714/4.1 |
| 2011/0102675 A1 | 5/2011 | Jackson | |
| 2011/0258665 A1 | 10/2011 | Fahrny et al. | |
| 2012/0060180 A1 | 3/2012 | Johansson | |
| 2018/0176027 A1* | 6/2018 | DelSordo | H04L 12/1435 |

* cited by examiner

MANAGEMENT OF AN ELECTRONIC CONTENT CATALOG BASED ON BANDWIDTH OR CONNECTED DISPLAY CAPABILITIES

TECHNICAL FIELD

The present disclosure relates generally to communication systems and more particularly to a method of managing a catalog of electronic content based on available network bandwidth or capabilities of a type of connected display.

BACKGROUND

Electronic content catalogs such as video catalogs display information about movies and videos available to be rented or purchased from a content provider. Generally, when more than one type of content such as standard definition (SD), three dimensional (3-D), or high definition (HD) exist, the different types are presented as separate purchases. When a purchase is made, a client device may use an Adaptive Bit Rate (ABR) technology to adjust its bandwidth in response to increases or decreases in network bandwidth. The client device is given an ABR video manifest, which is an index disclosing the various bitrates available to the client device, from which the client device chooses the most appropriate for its current bandwidth.

Some catalogs may be based on the type of device being utilized to browse the catalog or to download of the content rather than the device rendering the playback. Thus, it is possible for a customer to purchase titles that are either above the customer's available bandwidth or exceed the capabilities of the customer's playback device. For example, a customer may purchase a 3-D version of a movie, but the customer's playback device does not have a 3-D capable display screen. Extended Device Identification or EDID allows client devices to determine the video characteristics and capabilities of screens that are connected to the device. This is commonly used for PCs to adjust the resolution and frequency for a particular monitor.

Because of the adaptable nature of ABR video manifests, it is normal for a High Definition ABR video manifest to include much lower standard definition bitrates. This presents a problem when content purchased for a higher price (specifically for higher bitrates) is purchased for playback within a network where bandwidth to support the higher bitrates is not available. When a customer pays a higher price to purchase HD content, and the available bandwidth to their premises can never reach high definition bitrates, the customer is effectively receiving the standard definition content at the higher price.

Additionally, a catalog may be filtered based on the type of device being utilized to browse the catalog. This means the customer only sees catalog items that match the capabilities of the downloading device. For example, since 3-D content will not play back on non-3-D capable devices, a customer who browses the content from a PC that is not 3-D capable will never see 3-D content advertised even though the customer intends to view the content on a 3-D capable screen or monitor.

SUMMARY

The present disclosure provides a system and method for filtering a video catalog by adding or removing duplicate titles that are incompatible with the customer's available bandwidth or the customer's playout or rendering device rather than the browsing device. For example, when a customer's home network is only capable of viewing streams within the standard definition bitrates, then the system filters out higher priced HD versions that require more bandwidth than is available. Thus, the customer does not see the HD version for purchase in the catalog. Likewise, when the customer's playout or rendering device is not capable of displaying HD or 3-D video, the system filters out higher priced HD or 3-D versions, and these versions are not presented in the catalog.

In one embodiment, when a customer browses a video catalog from a device on a home network, a bandwidth calculation module determines the available bandwidth for the home network, and a comparison module determines the available bandwidth is less than what is needed for viewing HD or other high bitrate content. A content filter is then controlled to exclude HD titles from the video catalog presented to the customer. If it is determined at a future time that the available bandwidth for the home network is sufficient to stream HD content, the system may offer the customer the option to converting their purchase to an HD purchase.

In another embodiment, when a customer utilizes a tablet computer (which is not 3-D capable) to request the video catalog, the request includes an indication of the capabilities of a connected 3-D capable display. In this case, the content filter is controlled to include 3-D titles in the catalog presented to the customer.

Thus, one embodiment is directed to a method in a content provider server of creating a catalog of electronic content, wherein a customer accesses the catalog to browse and purchase electronic content, which is downloaded over a network to a customer premises where the electronic content is presented on a rendering device. Different pieces of the electronic content have different bandwidth requirements and different requirements for the rendering device. The method includes determining whether customer premises capabilities meet the requirements of each piece of electronic content; and populating the catalog only with pieces of electronic content for which the customer premises capabilities meet the requirements of the electronic content.

Another embodiment is directed to a content provider server configured to create a catalog of electronic content, wherein a customer accesses the catalog to browse and purchase electronic content, which is downloaded over a network to a customer premises where the electronic content is presented on a rendering device. Different pieces of the electronic content have different bandwidth requirements and different requirements for the rendering device. The server includes a processor coupled to a memory that stores computer program instructions. When the processor executes the computer program instructions, the processor causes the server to determine whether customer premises capabilities meet the requirements of each piece of electronic content; and populate the catalog only with pieces of electronic content for which the customer premises capabilities meet the requirements of the electronic content.

Another embodiment is directed to a system for creating a catalog of electronic content, wherein a customer accesses the catalog to browse and purchase electronic content, which is downloaded over a network to a customer premises where the electronic content is presented on a rendering device. Different pieces of the electronic content have different bandwidth requirements and different requirements for the rendering device. The system includes a content provider server that creates the catalog of electronic content; a browsing device at the customer premises that sends a request to the content provider server for the catalog; and a rendering device connected to the browsing device. The browsing device is configured to obtain information from the connected rendering device relating to the capabilities of the connected rendering device; and include the capabilities information for the connected rendering device in the request for the catalog. The content provider server is configured to receive the request for the catalog from the browsing device; determine whether the capabilities of the connected rendering device, rather than the browsing device, meet the rendering device requirements of each piece of electronic content; and populate the catalog only with pieces of electronic content for which the capabilities of the connected rendering device meet the rendering device requirements of the electronic content.

The disclosed solution is advantageous over current methods for displaying titles because it can lower customer expectations when purchasing content that they may not be able to fully experience. Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

The present invention will now be described more fully hereinafter with reference to the accompanying drawings, in which preferred embodiments of the invention are shown. In the description below, for purposes of explanation and not limitation, specific details are set forth in order to provide a thorough understanding of the present invention. It will be apparent to one skilled in the art that the present invention may be practiced in other embodiments that depart from these specific details.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a non-transitory memory coupled to the processor, wherein the memory is encoded with one or more programs that perform the method when executed by the processor.

In one embodiment, when a customer requests a content catalog for display, the system performs a household bandwidth calculation to determine playback capabilities. This calculation takes into account the customer's available bandwidth as well as the current video streaming activities within the customer premises. This calculation may be performed by interfacing with an ABR policy management system. Titles are presented to the customer based on a number of criteria such as available bandwidth limits, historical bandwidth usage, display capabilities of a reported display, or historical display information provided via technologies such as EDID.

Figure 1:
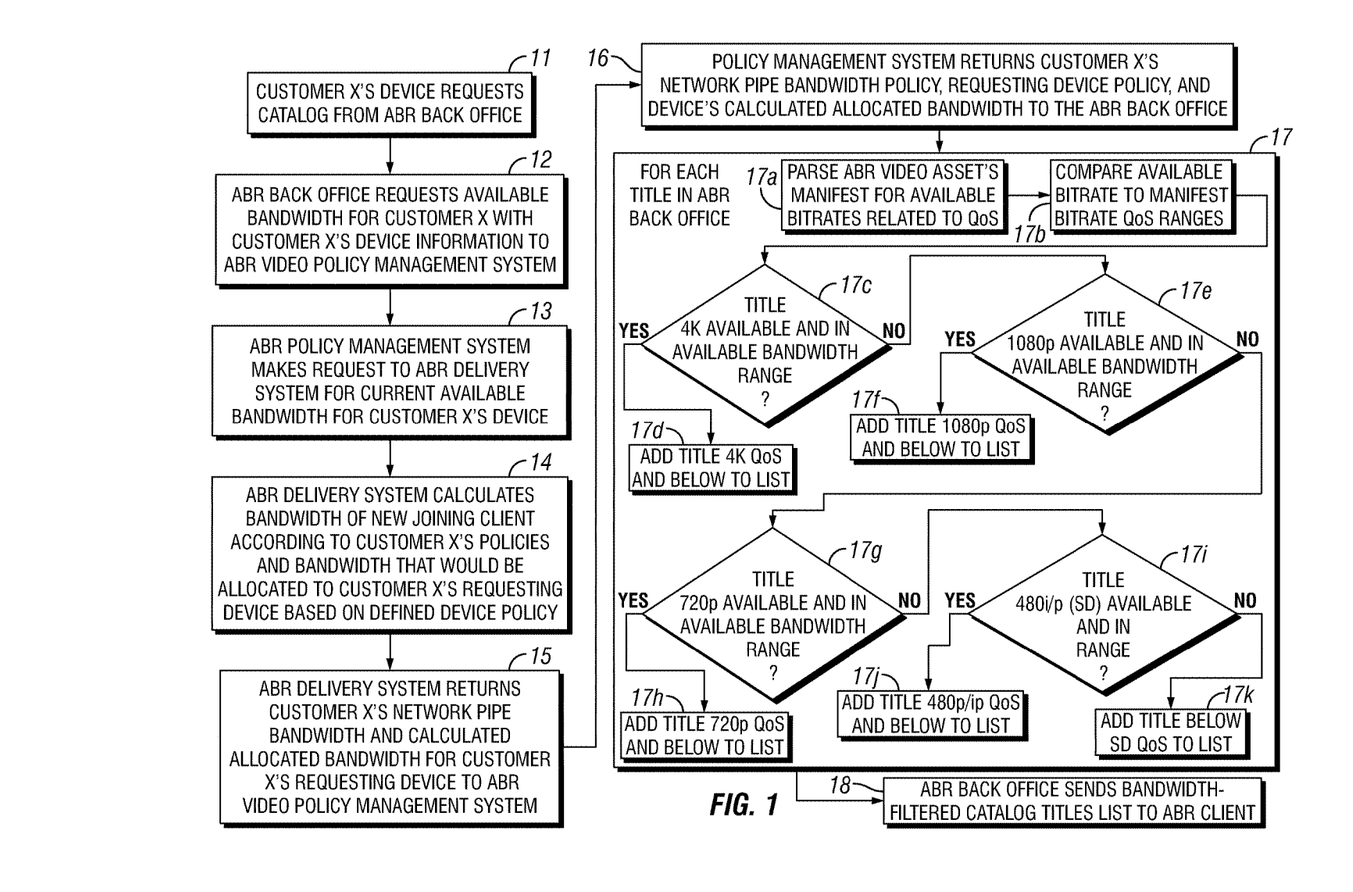
FIG. 1 is a flow chart illustrating the steps of an exemplary embodiment of a method of building a content catalog based on a customer's available bandwidth.

FIG. 1 is a flow chart illustrating the steps of an exemplary embodiment of a method of building a content catalog based on a customer's available bandwidth. At step 11, Customer X's device requests a catalog from the ABR back office. At step 12, the ABR back office requests the available bandwidth for Customer X by sending Customer X's device information to the ABR video policy management system. At step 13, the ABR policy management system makes a request to the ABR delivery system for the current available bandwidth for Customer X's device. At step 14, the ABR delivery system calculates the bandwidth of the new joining client according to Customer X's policies and the bandwidth that would be allocated to Customer X's requesting device based on defined device policy. At step 15, the ABR delivery system returns Customer X's network pipe bandwidth and calculated allocated bandwidth for Customer X's requesting device to the ABR video policy management system. At step 16, the policy management system returns Customer X's network pipe bandwidth policy, requesting device policy, and the device's calculated allocated bandwidth to the ABR back office.

For each title in the ABR back office, the back office performs a procedure 17. At step 17a, the ABR video asset's manifest is parsed for available bitrates related to QoS. At step 17b, the available bitrate is compared to the manifest bitrate QoS ranges. At step 17c, it is determined whether a title with 4K QoS is available and is in the available bandwidth range. If so, the method moves to step 17d where the back office adds titles with 4K QoS and below to the list for the catalog. When a title with 4K QoS is not available or is not in the available bandwidth range, the method moves instead to step 17e where it is determined whether a title with 1080p QoS is available and is in the available bandwidth range. If so, the method moves to step 17f where the back office adds titles with 1080p QoS and below to the list for the catalog. When a title with 1080p QoS is not available or is not in the available bandwidth range, the method moves instead to step 17g where it is determined whether a title with 720p QoS is available and is in the available bandwidth range. If so, the method moves to step 17h where the back office adds titles with 720p QoS and below to the list for the catalog. When a title with 720p QoS is not available or is not in the available bandwidth range, the method moves instead to step 17i where it is determined whether a title with 480i/p (SD) QoS is available and is in the available bandwidth range. If so, the method moves to step 17j where the back office adds titles with 480i/p QoS and below to the list for the catalog. When a title with 480i/p QoS is not available or is not in the available bandwidth range, the method moves instead to step 17k where titles with less than SD QoS are added to the list for the catalog. Once procedure 17 is completed, the method moves to step 18 where the ABR back office sends the bandwidth-filtered catalog titles list to the ABR client.

Figure 2:
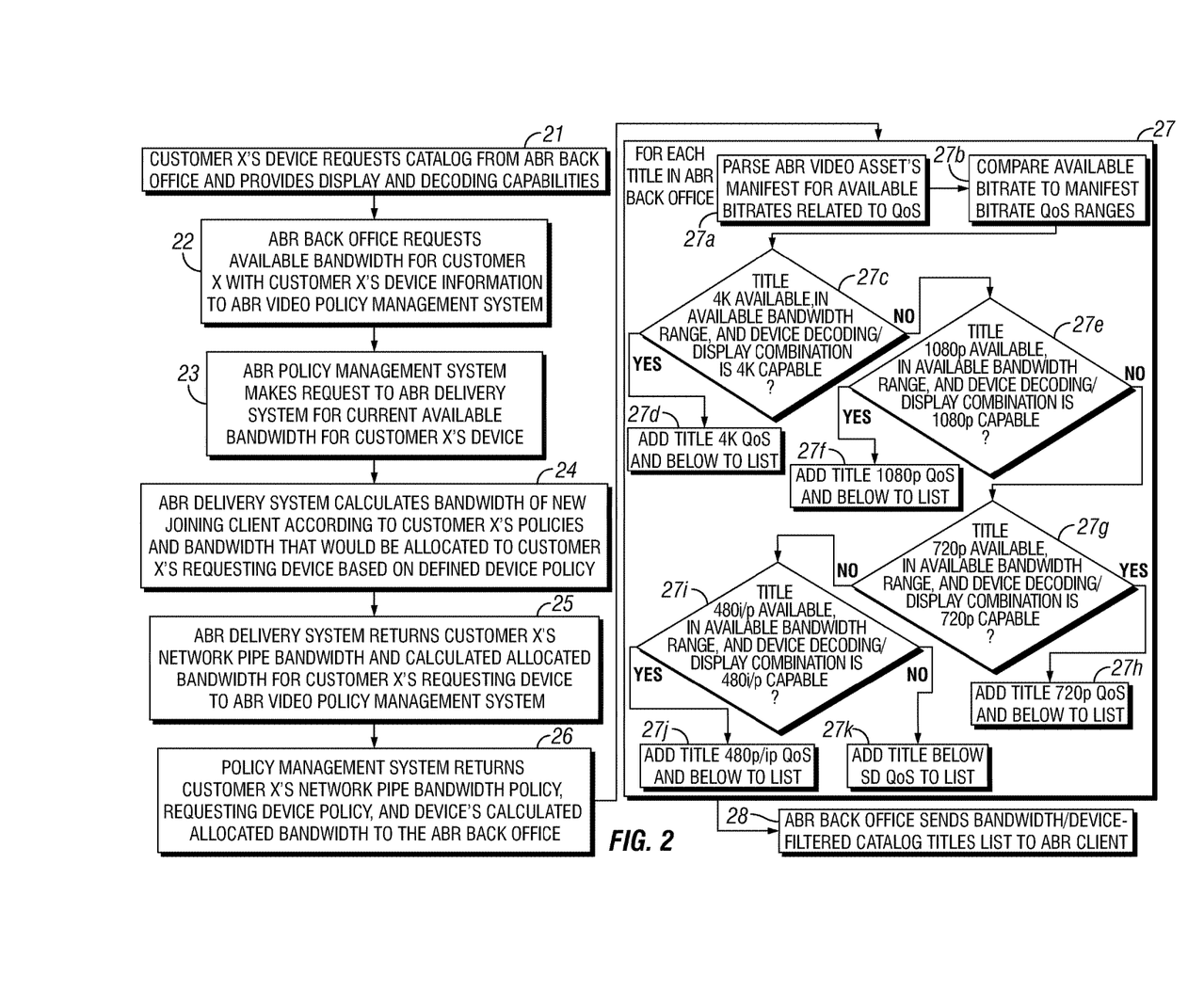
FIG. 2 is a flow chart illustrating the steps of an exemplary embodiment of a method of building a content catalog based on a customer's available bandwidth and rendering device capabilities.

FIG. 2 is a flow chart illustrating the steps of an exemplary embodiment of a method of building a content catalog based on a customer's available bandwidth and rendering device capabilities. At step 21, Customer X's device requests a catalog from the ABR back office and provides display and decoding capabilities of the device. At step 22, the ABR back office requests the available bandwidth for Customer X by sending Customer X's device information to the ABR video policy management system. At step 23, the ABR policy management system makes a request to the ABR delivery system for the current available bandwidth for Customer X's device. At step 24, the ABR delivery system calculates the bandwidth of the new joining client according to Customer X's policies and the bandwidth that would be allocated to Customer X's requesting device based on defined device policy. At step 25, the ABR delivery system returns Customer X's network pipe bandwidth and calculated allocated bandwidth for Customer X's requesting device to the ABR video policy management system. At step 26, the policy management system returns Customer X's network pipe bandwidth policy, requesting device policy, and the device's calculated allocated bandwidth to the ABR back office.

For each title in the ABR back office, the back office performs a procedure 27. At step 27a, the ABR video asset's manifest is parsed for available bitrates related to QoS. At step 27b, the available bitrate is compared to the manifest bitrate QoS ranges. At step 27c, it is determined whether a title with 4K QoS is available and is in the available bandwidth range, and whether the device decoding/display combination is 4K capable. If so, the method moves to step 27d where the back office adds titles with 4K QoS and below to the list for the catalog. When a title with 4K QoS is not available or is not in the available bandwidth range, or the device decoding/display combination is not 4K capable, the method moves instead to step 27e where it is determined whether a title with 1080p QoS is available and is in the available bandwidth range, and whether the device decoding/display combination is 1080p capable. If so, the method moves to step 27f where the back office adds titles with 1080p QoS and below to the list for the catalog. When a title with 1080p QoS is not available or is not in the available bandwidth range, or the device decoding/display combination is not 1080p capable, the method moves instead to step 27g where it is determined whether a title with 720p QoS is available and is in the available bandwidth range, and whether the device decoding/display combination is 720p capable. If so, the method moves to step 27h where the back office adds titles with 720p QoS and below to the list for the catalog. When a title with 720p QoS is not available or is not in the available bandwidth range, or the device decoding/display combination is not 720p capable, the method moves instead to step 27i where it is determined whether a title with 480i/p (SD) QoS is available and is in the available bandwidth range, and whether the device decoding/display combination is 480i/p capable. If so, the method moves to step 27j where the back office adds titles with 480i/p QoS and below to the list for the catalog. When a title with 480i/p QoS is not available or is not in the available bandwidth range, or the device decoding/display combination is not 480i/p capable, the method moves instead to step 27k where titles with less than SD QoS are added to the list for the catalog. Once procedure 27 is completed, the method moves to step 28 where the ABR back office sends the bandwidth and device-filtered catalog titles list to the ABR client.

Figure 3:
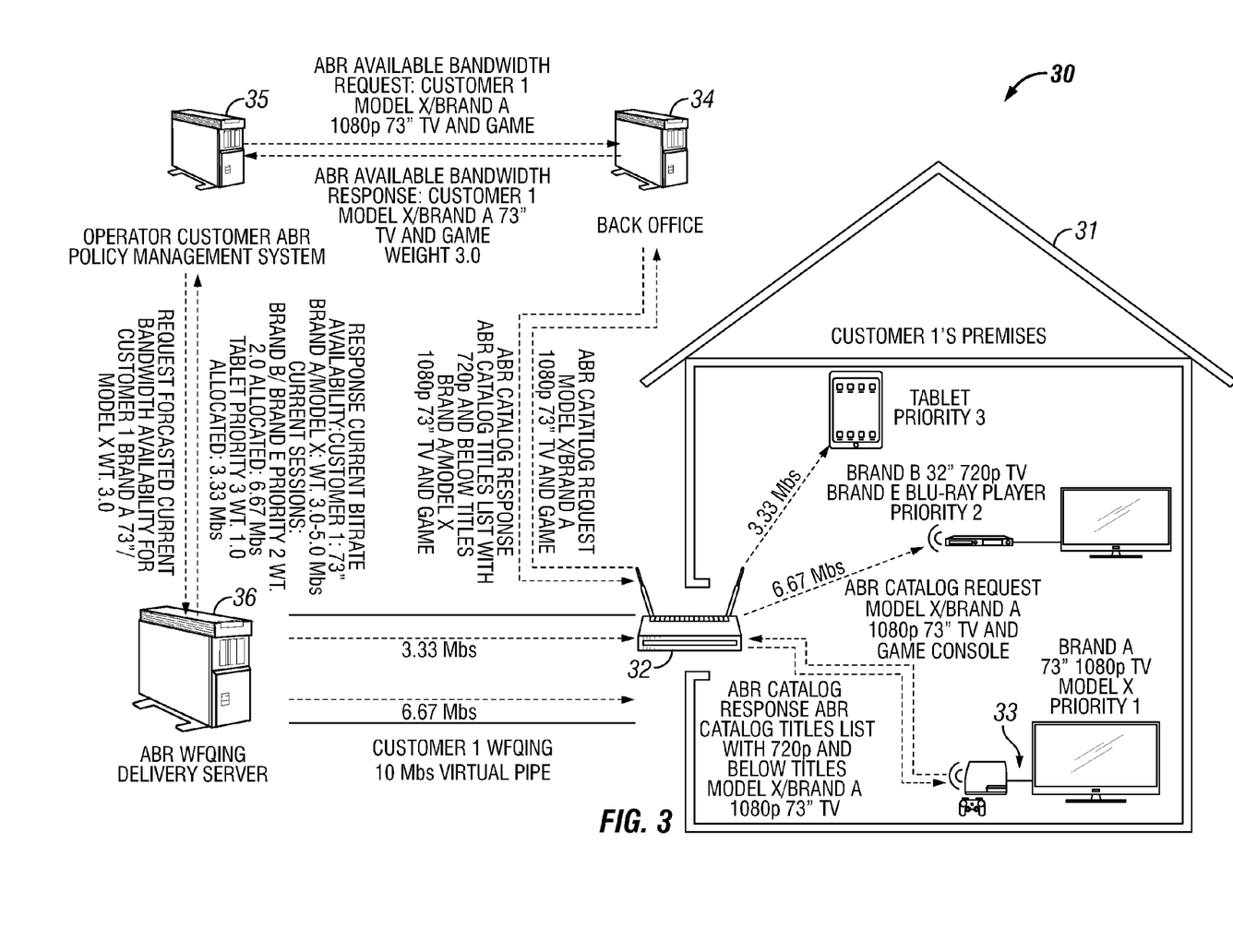
FIG. 3 is a simplified block diagram of an exemplary embodiment of a system for building a content catalog based on a customer's available bandwidth.

FIG. 3 is a simplified block diagram of an exemplary embodiment of a system (30) for building a content catalog based on a customer's available bandwidth. The example shows Customer 1's premises 31, which may contain one or more types of televisions, tablet computers, Blu-Ray DVD players, game consoles, smart phones, and the like. Access outside the premises may be through an Internet router 32 or similar. As shown, a catalog request is sent from a 1080p 73-inch television and game console 33 to the ABR back office 34. The ABR back office requests the available bandwidth for Customer 1 by sending Customer 1's device information to the ABR video policy management system 35. The ABR policy management system makes a request to the ABR delivery system 36 for the current available bandwidth for Customer 1's device. The ABR delivery system, which may be, for example, a Weighted Fair Queuing (WFQing) delivery system, calculates the bandwidth of the television and game console 33 according to Customer 1's policies and the bandwidth that would be allocated to the television and game console based on defined device policy. The ABR WFQing delivery system 36 returns Customer 1's network pipe bandwidth and calculated allocated bandwidth for the television and game console 33 to the ABR video policy management system 35. The policy management system returns Customer 1's network pipe bandwidth policy, requesting device policy, and the television and game console's calculated allocated bandwidth to the ABR back office 34. The ABR back office builds the content catalog in accordance with procedure 17, and sends the catalog list with 720p and below titles for display on the television 33.

Figure 4:
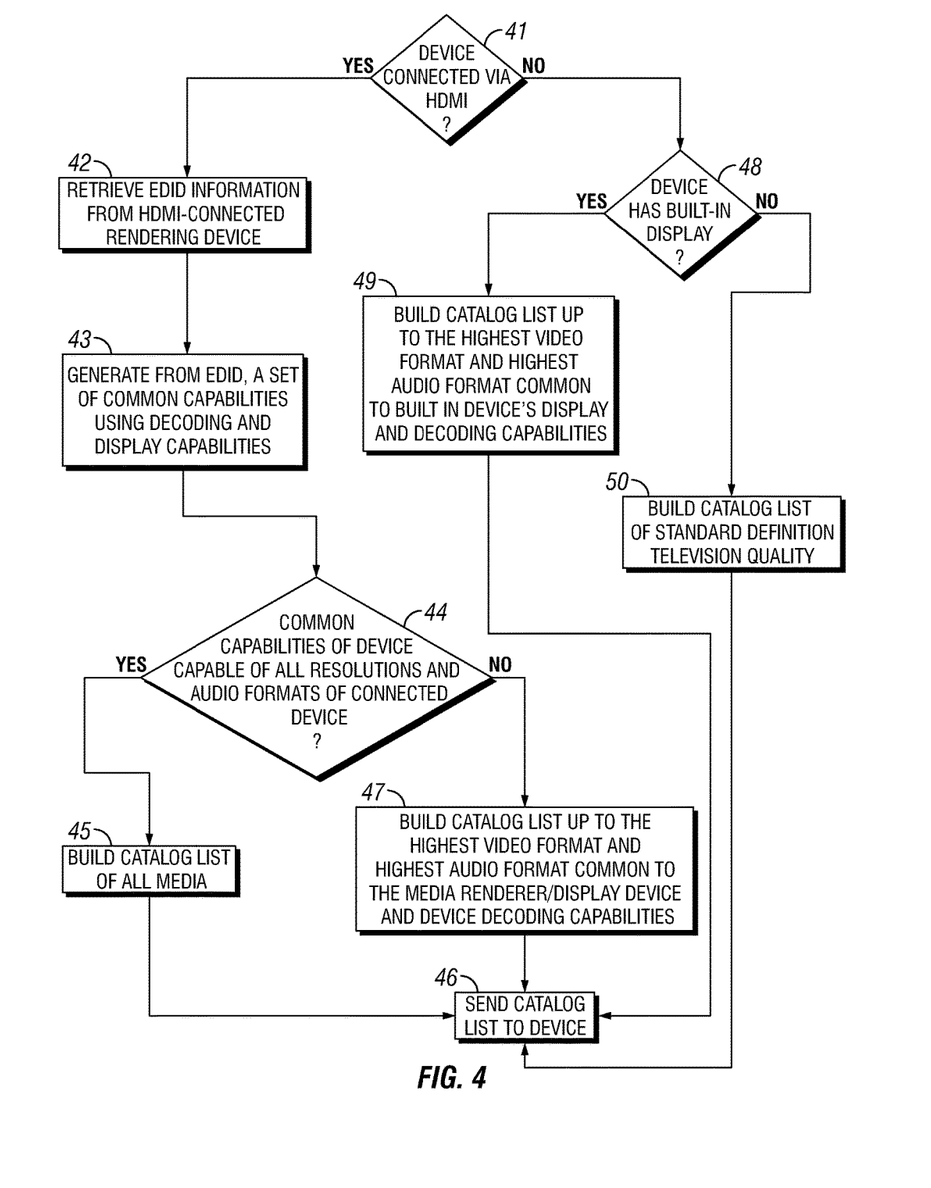
FIG. 4 is a flow chart illustrating the steps of an exemplary embodiment of a method of building a content catalog based on Extended Device Identification (EDID) information.

FIG. 4 is a flow chart illustrating the steps of an exemplary embodiment of a method of building a content catalog based on Extended Device Identification (EDID) information. At step 41, it is determined whether a rendering device is connected to a device requesting a content catalog via an HDMI connection. If so, the method moves to step 42 where EDID information is retrieved from the HDMI-connected rendering device. At step 43, from the EDID information, a set of common capabilities is generated using decoding and display capabilities. At step 44, it is determined whether the common capabilities of the device are capable of handling all resolutions and audio formats of the connected device. If so, the method moves to step 45 where a catalog list of all media is built. The catalog list is then sent to the requesting device at step 46. When the common capabilities of the device are not capable of handling all resolutions and audio formats of the connected device, the method moves instead to step 47 where a catalog list is built up to the highest video format and highest audio format common to the media renderer/display device and device decoding capabilities. The catalog list is then sent to the requesting device at step 46.

When it is determined at step 41, that a rendering device is not connected via an HDMI connection to the device requesting a content catalog, the method moves from step 41 to step 48 where it is determined whether the requesting device has a built-in display. If so, the method moves to step 49 where a catalog list is built up to the highest video format and highest audio format common to the built-in device's display and decoding capabilities. The catalog list is then sent to the requesting device at step 46.

When it is determined at step 48, that the requesting device does not have a built-in display, the method moves to step 50 where a catalog list is built of SD television quality. The catalog list is then sent to the requesting device at step 46.

Figure 5A:
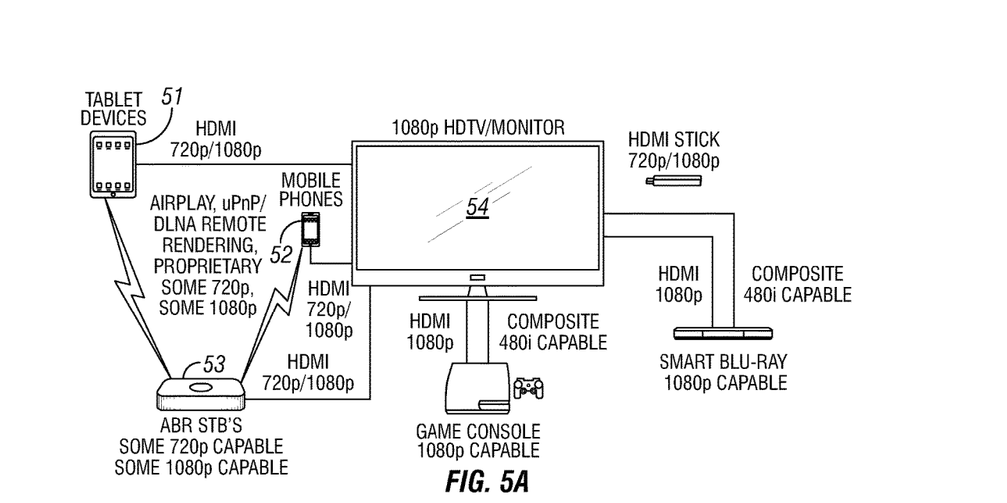
FIGS. 5A-5C are simplified block diagrams of different configurations of customer premises equipment.
Figure 5B:
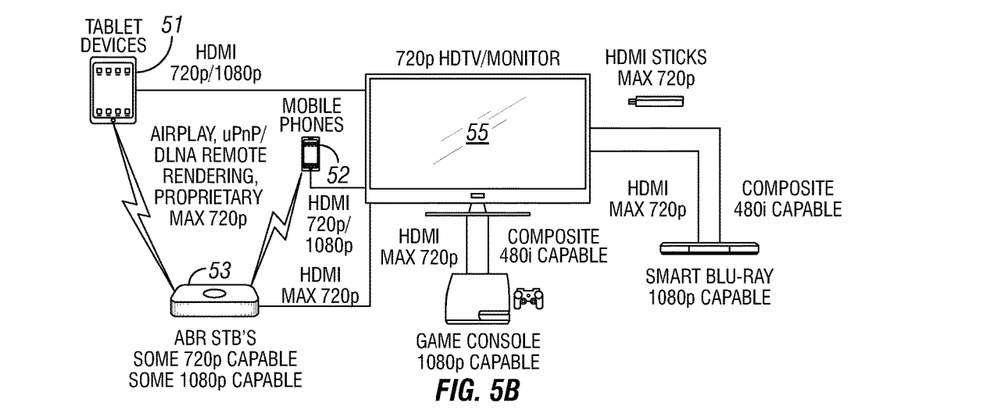
Figure 5C:
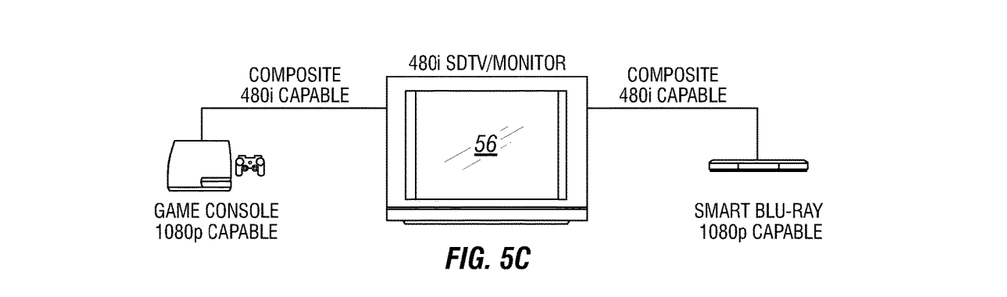

FIGS. 5A-5C are simplified block diagrams of different configurations of customer premises equipment that may be utilized with the system of the present disclosure. Requesting devices such as tablet devices 51 and mobile phones 52 may request a content catalog through, for example, an ABR set top box (STB) 53. In each case, the system will build a content catalog that includes only titles that the customer premises equipment is capable of displaying. When a less capable device requests the catalog, the system may provide a catalog with titles having a QoS level compatible with the requesting device. However, when the requesting device is connected to a more capable rendering device, the system may provide a catalog with titles having a QoS level compatible with the more capable rendering device. Depicted rendering devices include a 1080p HDTV/monitor 54 (FIG. 5A), a 720p HDTV/monitor 55 (FIG. 5B), and a 480i SDTV/monitor 56 (FIG. 5C).

Figure 6:
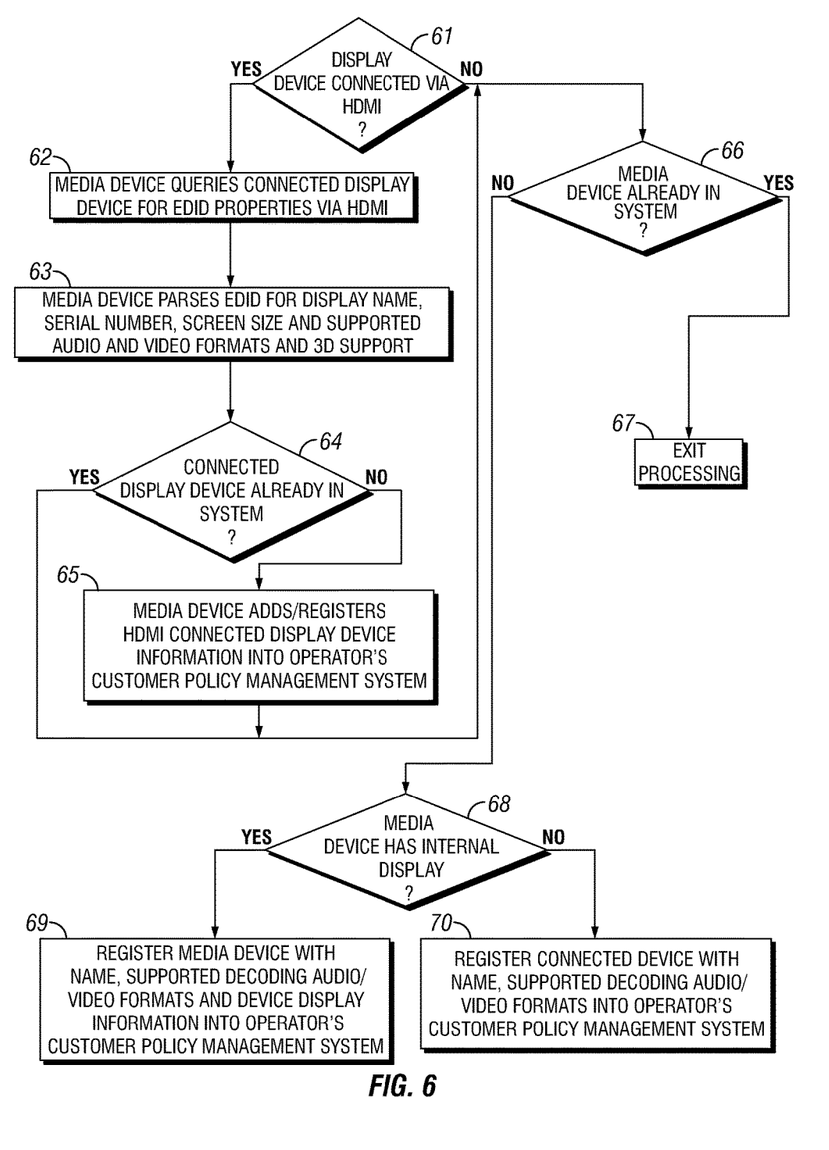
FIG. 6 is a flow chart illustrating the steps of an exemplary embodiment of a method of automatically registering a newly connected display device.

FIG. 6 is a flow chart illustrating the steps of an exemplary embodiment of a method of automatically registering a newly connected display device. At step 61, it is determined whether a rendering display device connected to a requesting media device is connected via an HDMI connection. If so, the method moves to step 62 where the media device queries the display device for EDID properties information using the HDMI connection. At step 63, the media device parses the EDID properties information to determine, for example, a display name, serial number, screen size, supported audio and video formats, and 3D support for the connected display device. At step 64, it is determined whether the connected display device is already known in the system. If not, the media device adds/registers the connected display device information into the operator's customer policy management system 35 (FIG. 3).

Once the information is in the system, or if the information was already in the system, the method moves to step 66 where it is determined whether the media device is already in the system. If so, the registration method is complete and processing ends at step 67. However, if the media device is not already in the system, the method moves to step 68 where it is determined whether the media device has an internal display. If so, the method moves to step 69 where media device information (such as its name, supported decoding audio/video formats, and internal display information) is registered into the operator's customer policy management system 35. However, when the media device does not have an internal display, the method moves to step 70 where the media device information (such as its name and supported decoding audio/video formats) is registered into the operator's customer policy management system.

Figure 7:
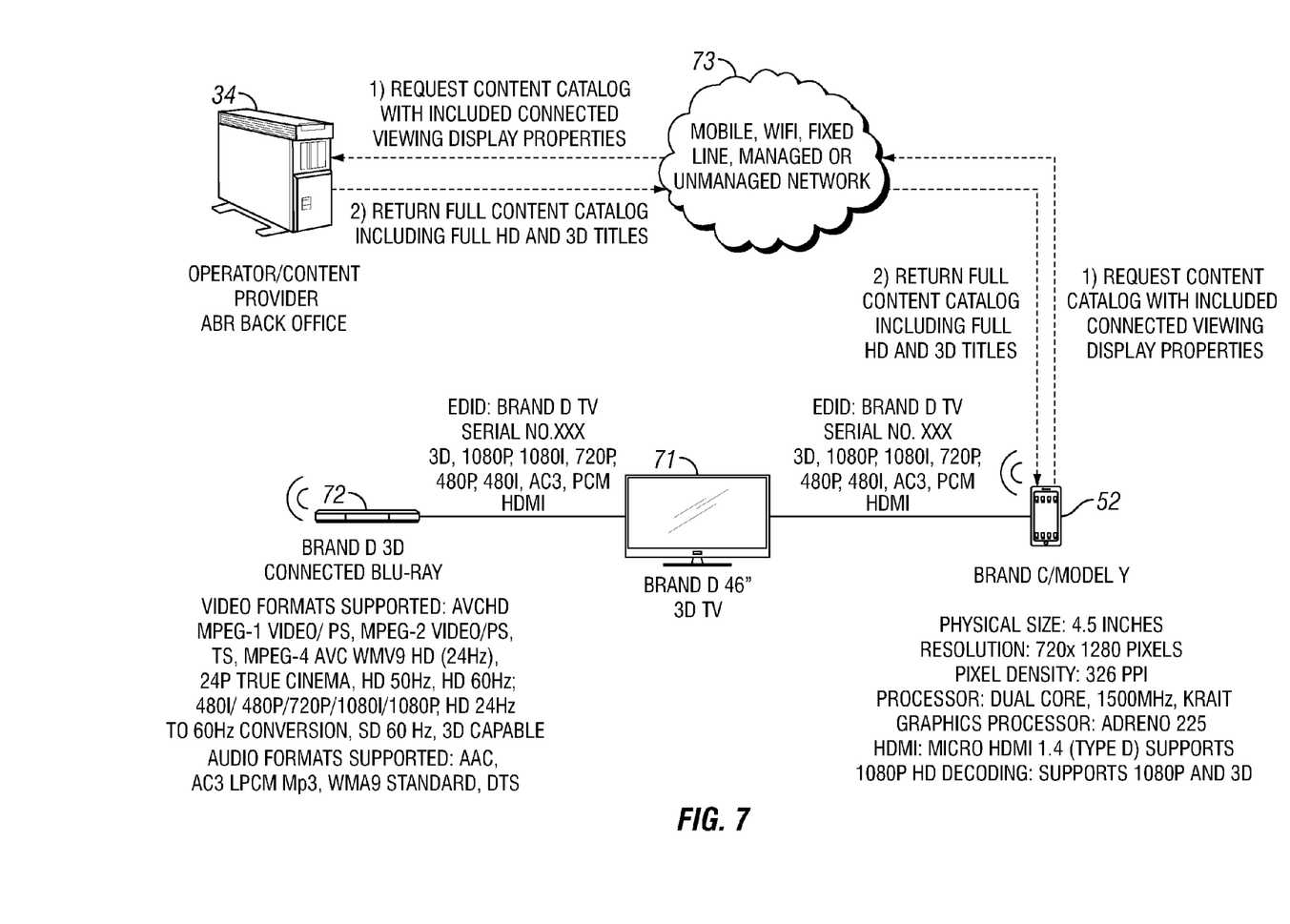
FIG. 7 is a simplified block diagram of an exemplary embodiment of a system for building a content catalog with full HD and 3D titles when requested through a mobile device.

FIG. 7 is a simplified block diagram of an exemplary embodiment of a system for building a content catalog with full HD and 3D titles when requested through a mobile device 52. The mobile device (such as a tablet computer or smart phone) is connected via an HDMI connection to an HD television 71, which is further connected to a Blu-ray 3D DVD player. The mobile device obtains EDID properties information from the HD television (which are superior to the mobile device) and sends this information with a request for a content catalog through a network 73 (e.g., mobile, WiFi, fixed line, managed or unmanaged network) to the operator/content provider ABR back office 34. In response to the superior capabilities of the connected HD television, the back office builds and returns a content catalog that includes full HD and 3D titles.

Figure 8:
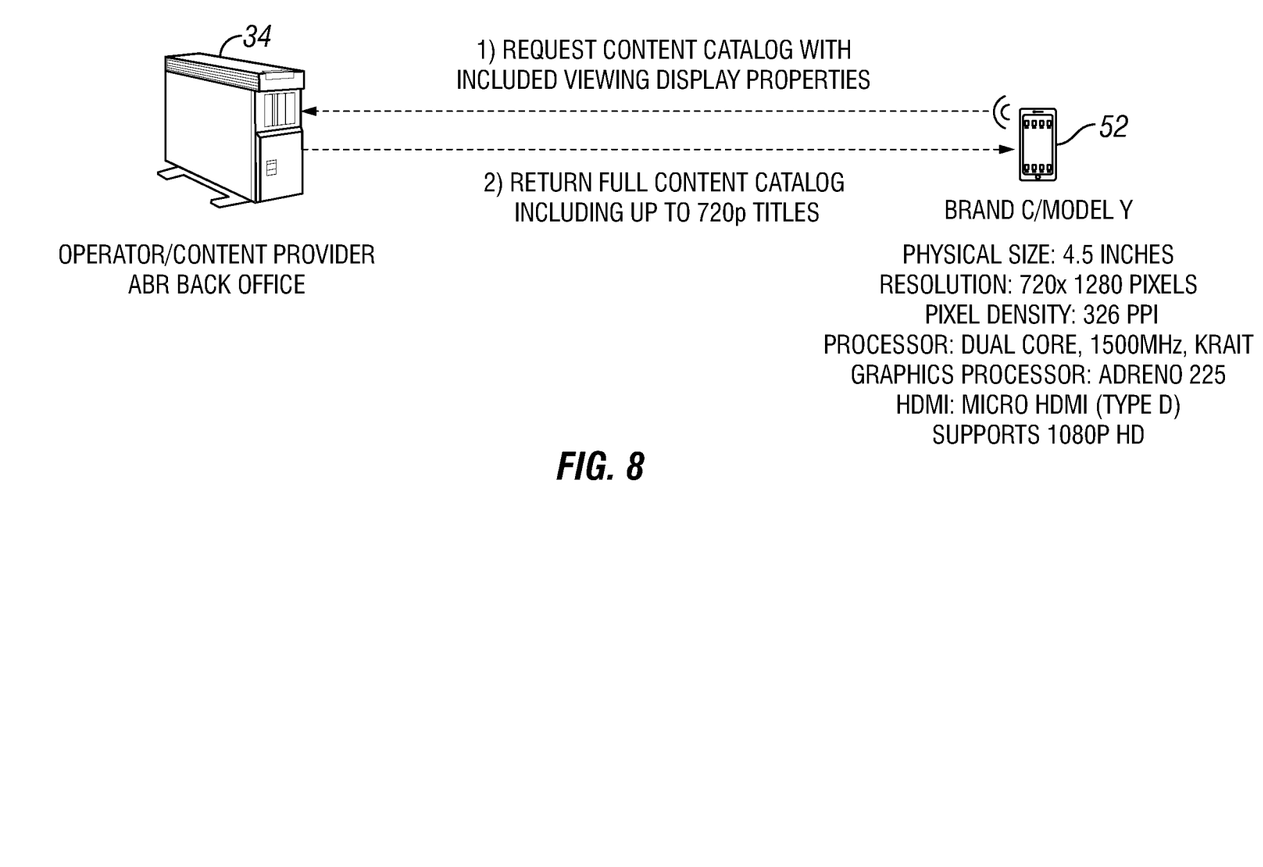
FIG. 8 is a simplified block diagram of an exemplary embodiment of a system for building a content catalog with titles having quality up to 720p when requested through a mobile device.

FIG. 8 is a simplified block diagram of an exemplary embodiment of a system for building a content catalog with titles having quality up to 720p when requested through a mobile device 52. In this example, the mobile device is a standalone device without an external display. Thus, the request for a content catalog includes only the properties of the internal display of the mobile device. In response, the operator/content provider ABR back office 34 returns a content catalog including up to 720p titles.

Figure 9:
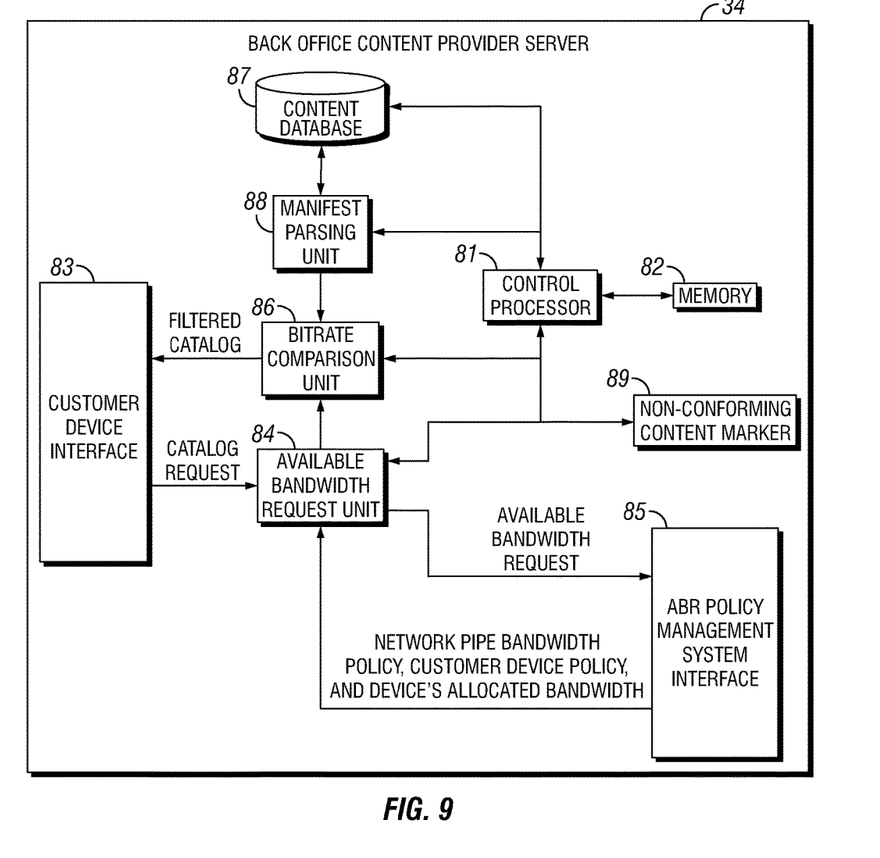
FIG. 9 is a simplified block diagram of an exemplary embodiment of a back office content provider server according to the present disclosure.

FIG. 9 is a simplified block diagram of an exemplary embodiment of a back office content provider server 34 according to the present disclosure. The server may be controlled, for example, by a control processor 81 coupled to a memory 82 that stores computer program instructions. A Customer Device Interface 83 provides communication to and from customer devices that may request a content catalog. Catalog requests include decoding and displaying capabilities of the requesting customer device, and may also include decoding and displaying capabilities of connected rendering display devices. When a catalog request is received from Customer X, the Customer Device Interface passes the request and the capabilities information to a processing unit known as an Available Bandwidth Request Unit 84. The Available Bandwidth Request Unit requests the available bandwidth for Customer X by sending Customer X's device information to the ABR video policy management system 35 (FIG. 3) via an ABR Policy Management System Interface 85. After checking with the ABR WFQing delivery server 36, the policy management system returns Customer X's network pipe bandwidth policy, requesting device policy, and the device's calculated allocated bandwidth to the Available Bandwidth Request Unit 84. The Available Bandwidth Request Unit provides this information to a Bitrate Comparison Unit 86.

For each title stored in a content database 87, a Manifest Parsing Unit 88 parses the title's manifest for available bitrates related to QoS. These bitrates are provided to the Bitrate Comparison Unit 86, which compares them with bandwidth information received from the Available Bandwidth Request Unit 84. Each title that has a bandwidth requirement less than or equal to the available bandwidth for Customer X's device, and that meets the device's decoding and display capabilities, is added to the content catalog. The filtered catalog is then returned to Customer X's device.

In another embodiment, the server 34 is configured to populate the catalog with pieces of electronic content for which the customer premises capabilities do not meet the requirements of the electronic content. In this case, a Non-conforming Content Marker 89 places an indication in the catalog that these non-conforming pieces of electronic content have requirements that exceed the customer premises capabilities. For example, when the available bandwidth to the customer premises does not meet the bandwidth requirement of a given piece of electronic content, the Non-conforming Content Marker may indicate in the catalog that the given piece of electronic content has a bandwidth requirement that exceeds the available bandwidth to the customer premises. Likewise, when the capabilities of the identified rendering device do not meet the rendering device requirements of a given piece of electronic content, the Non-conforming Content Marker may indicate in the catalog that the given piece of electronic content has a rendering device requirement that exceeds the capabilities of the identified rendering device.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a content provider server, the method comprising:
   receiving a request for a content catalog from a customer's requesting device disposed in a customer premises having a plurality of customer premises equipment (CPE) devices, the plurality of CPE devices including the requesting device and served via a bandwidth pipe coupled to the customer premises for receiving respective adaptive bitrate (ABR) streams of content;
   calculating a bandwidth portion of the bandwidth pipe of the customer premises that can be allocated to the requesting device upon taking into account existing ABR streaming sessions of at least a subset of the plurality of the CPE devices;
   for each content title available at the content provider server, each content title having a plurality of bitrates, determining a range of bitrates of the content title that can be accommodated in the bandwidth portion allocated to the requesting device;
   creating a filtered list of content titles containing only those content titles whose range of bitrates can be accommodated in the bandwidth portion allocated to the requesting device;
   populating the content catalog at least with the filtered list of content titles; and
   providing the content catalog containing the filtered list of content titles to the requesting device.

2. The method according to claim 1, wherein the request for a content catalog includes resolution capabilities of an identified rendering device coupled to the customer's requesting device, and the step of determining a range of bitrates for each content title is further based on determining whether the resolution capabilities of the identified rendering device are compatible with a particular bitrate of a content title.

3. The method according to claim 1, further comprising also populating the content catalog with content titles whose bitrates cannot be accommodated in the bandwidth portion allocated to the requesting device, including an indication for such content files in the content catalog as having requirements that exceed the customer premises bandwidth pipe capabilities.

4. The method according to claim 1, wherein the customer's requesting device is a browsing device connected to a rendering device, and the request for a content catalog includes an indication of capabilities of the connected rendering device.

5. A content provider network node, comprising:
   a control processor; and
   one or more modules coupled to the control processor, the one or more modules containing program instructions that perform following acts when executed by the control processor:
      receiving, at a customer device interface, a request for a content catalog from a customer's requesting device disposed in a customer premises having a plurality of customer premises equipment (CPE) devices, the plurality of CPE devices including the requesting device and served via a bandwidth pipe coupled to the customer premises for receiving respective adaptive bitrate (ABR) streams of content;
      calculating a bandwidth portion of the bandwidth pipe of the customer premises that can be allocated to the requesting device upon taking into account existing ABR streaming sessions of at least a subset of the plurality of the CPE devices;
      for each content title available at the content provider server, each content title having a plurality of bitrates, determining a range of bitrates of the content title that can be accommodated in the bandwidth portion allocated to the requesting device;
      creating a filtered list of content titles containing only those content titles whose range of bitrates can be accommodated in the bandwidth portion allocated to the requesting device;
      populating the content catalog at least with the filtered list of content titles; and
      providing the content catalog containing the filtered list of content titles to the requesting device.

6. The content provider network node according to claim 5, wherein the request for a content catalog includes resolution capabilities of an identified rendering device coupled to the customer's requesting device, and the program instructions for determining a range of bitrates for each content title further include instructions for determining whether the resolution capabilities of the identified rendering device are compatible with a particular bitrate of a content title.

7. The content provider network node according to claim 5, wherein the program instructions for populating the content catalog further comprise instructions for also populating the content catalog with content titles whose bitrates cannot be accommodated in the bandwidth portion allocated to the requesting device, including an indication for such content titles in the content catalog as having requirements that exceed the customer premises bandwidth pipe capabilities.

* * * * *